United States Patent
Chang et al.

(10) Patent No.: US 8,284,754 B2
(45) Date of Patent: Oct. 9, 2012

(54) APPARATUS AND METHOD FOR DETERMINING TIME TO RESPONSE OF RETRANSMISSION IN A MULTIHOP RELAY WIRELESS COMMUNICATION SYSTEM

(75) Inventors: Young-Bin Chang, Anyang-si (KR); Rakesh Taori, Suwon-si (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 601 days.

(21) Appl. No.: 12/206,301

(22) Filed: Sep. 8, 2008

(65) Prior Publication Data

US 2009/0067364 A1    Mar. 12, 2009

(30) Foreign Application Priority Data

Sep. 8, 2007    (KR) .................. 10-2007-0091259
Sep. 17, 2007    (KR) .................. 10-2007-0094427

(51) Int. Cl.
*H04J 3/06*    (2006.01)

(52) U.S. Cl. ........................................ 370/350; 455/502
(58) Field of Classification Search ........................ None
See application file for complete search history.

(56) References Cited

U.S. PATENT DOCUMENTS

| 7,227,868 | B2 | 6/2007 | Inden | |
| 2005/0249120 | A1* | 11/2005 | Heo et al. | 370/236 |
| 2006/0233200 | A1 | 10/2006 | Fifield et al. | |
| 2007/0190933 | A1* | 8/2007 | Zheng et al. | 455/7 |

FOREIGN PATENT DOCUMENTS

| KR | 10-2006-0004935 A | 1/2006 |
| KR | 10-2007-0048438 A | 5/2007 |

* cited by examiner

*Primary Examiner* — Jianye Wu
(74) *Attorney, Agent, or Firm* — Jefferson IP Law, LLP

(57) ABSTRACT

A multihop relay wireless communication system is provided. A Base Station (BS) includes a calculator for calculating an ACKnowledge (ACK)/Non ACK (NACK) transmission time of at least one Relay Station (RS) using retransmission parameter values, and a transmitter for transmitting the ACK/NACK transmission time information to the at least one RS.

22 Claims, 7 Drawing Sheets

APPARATUS AND METHOD FOR DETERMINING TIME TO RESPONSE OF RETRANSMISSION IN A MULTIHOP RELAY WIRELESS COMMUNICATION SYSTEM

PRIORITY

This application claims the benefit under 35 U.S.C. §119(a) of a Korean patent application filed in the Korean Intellectual Property Office on Sep. 8, 2007 and assigned Serial No. 2007-91259 and a Korean patent application filed in the Korean Intellectual Property Office on Sep. 17, 2007 and assigned Serial No. 2007-94427, the entire disclosures of both of which are hereby incorporated by reference.

BACKGROUND OF THE INVENTION

1. Field of the Invention

The present invention relates to a multihop relay wireless communication system. More particularly, the present invention relates to an apparatus and a method for determining a transmission time of a response signal in a multihop relay wireless communication system.

2. Description of the Related Art

In a wireless communication system, data transmitted and received over a radio channel can be distorted due to a channel condition and the received data may be subject to an error. Techniques for controlling and recovering the error include an Automatic Retransmission reQuest (ARQ) scheme and a Frame Error Check (FEC) scheme. According to the ARQ scheme, a receiving end requests retransmission of the compromised data to a transmitting end. According to the FEC scheme, the receiving end corrects the error caused by the corrupted data.

When the wireless communication system adopts the ARQ scheme, the receiving end can check for an error by decoding a received packet. When there is no error, the receiving end sends an ACKnowledge (ACK) signal to the transmitting end. When the data has an error, the receiving end sends a Non ACK (NACK) signal to the transmitting end. Receiving the ACK signal, the transmitting end sends a new packet. Receiving the NACK signal, the transmitting end retransmits the previous packet.

In response to the increasing demands for high-speed and high-capacity communications, adaptation of a multihop relay scheme is being considered. The multihop relay scheme ensures a good radio channel to a terminal traveling in a cell boundary or in a shadow area by using a relay station which relays signals between a base station and the terminal through the radio channel. That is, the multihop relay wireless communication system can provide a better radio channel between the base station and the terminal by relaying data transmitted and received between the base station and the terminal via the relay station.

Since the radio channel between the base station and the terminal includes a plurality of hops in the multihop relay scheme, signals are transmitted and received by multiple nodes. Accordingly, it is quite difficult to apply the ARQ scheme in the multihop relay wireless communication system. Therefore, what is needed is a method for executing the ARQ scheme by taking into account the relay station in the multihop relay wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for using an Automatic Retransmission reQuest (ARQ) scheme in a multihop relay wireless communication system.

Another aspect of the present invention is to provide an apparatus and a method for determining an ARQ response time in a multihop relay wireless communication system.

Yet another aspect of the present invention is to provide an apparatus and a method for informing a base station, a relay station, and a terminal of an ARQ response time in a multihop relay wireless communication system.

The above aspects are addressed by providing an apparatus for a Base Station (BS) in a multihop relay wireless communication system. The apparatus includes a calculator for calculating an ACKnowledge (ACK)/Non ACK (NACK) transmission time of at least one Relay Station (RS) using retransmission parameter values, and a transmitter for transmitting the ACK/NACK transmission time information to the at least one RS.

According to one aspect of the present invention, an apparatus for a Relay Station (RS) in a multihop relay wireless communication system includes a receiver for receiving ACK/NACK transmission time information that originated at a BS, and a transmitter for transmitting an ACK/NACK in relation to a packet corresponding to the ACK/NACK transmission time in a frame indicated by the ACK/NACK transmission time information.

According to another aspect of the present invention, an operating method of a BS in a multihop relay wireless communication system includes calculating an ACK/NACK transmission time of at least one RS using retransmission parameter values, and transmitting the ACK/NACK transmission time information to the at least one RS.

According to yet another aspect of the present invention, an operating method of an RS in a multihop relay wireless communication system includes receiving ACK/NACK transmission time information that originated at a BS, and transmitting an ACK/NACK in relation to a packet corresponding to the ACK/NACK transmission time in a frame indicated by the ACK/NACK transmission time information.

According to still another aspect of the present invention, an operating method of an RS in a multihop relay wireless communication system includes receiving retransmission parameter values of one or more other RSs from a BS, calculating an ACK/NACK transmission time using the retransmission parameter values, and transmitting ACK/NACK according to the calculated ACK/NACK transmission time information. The retransmission parameter values include at least one of an UpLink (UL) data processing delay time of the one or more other RSs, a DownLink (DL) data processing delay time of the other one or more RSs, and an ACK/NACK transmission delay time of the other one or more RSs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for using an Automatic Retransmission reQuest (ARQ) scheme in a multihop relay wireless communication system. Herein, the wireless communication system is described as an Orthogonal Frequency Division Multiplexing (OFDM) wireless communication system as an example. However, the present invention is applicable to other wireless communication systems.

Figure 1:
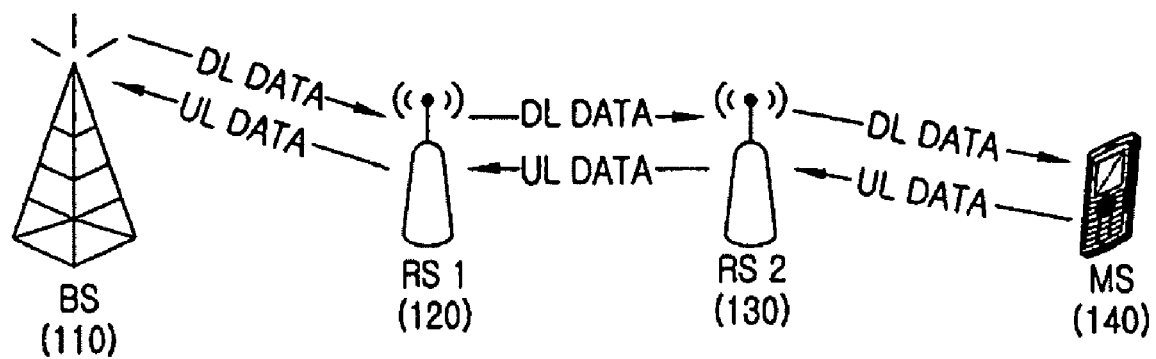
FIG. 1 illustrates signal paths between a base station and a terminal in a multihop relay wireless communication system according to an exemplary embodiment of the present invention.

FIG. 1 illustrates signal paths between a base station and a terminal in a multihop relay wireless communication system according to an exemplary embodiment of the present invention.

Referring to FIG. 1, DownLink (DL) data between a Base Station (BS) 110 and a Mobile Station (MS) 140 in 3-hop relay communications is sent from the BS 110 to the MS 140 via a first Relay Station (RS) 120 and a second RS 130. That is, the BS 110 sends the DL data to the first RS 120, the first RS 120 forwards the DL data to the second RS 130, and the second RS 130 forwards the DL data to the MS 140.

In the multihop relay wireless communication system, UpLink (UL) data between the BS 110 and the MS 140 in the 3-hop relay communications is sent from the MS 140 to the BS 110 via the second RS 130 and the first RS 120. That is, the MS 140 transmits the UL data to the second RS 130, the second RS 130 relays the UL data to the first RS 120, and the first RS 120 relays the UL data to the BS 110.

When the received UL data or the received DL data is corrupted because of a channel distortion, the BS 110 or the MS 140 retransmits and receives error-free data using the ARQ scheme. When the multihop relay wireless communication system adopts a centralized scheduling scheme for the retransmission based on the ARQ scheme, the BS 110 needs to confirm ACK/NACK from the RSs 120 and 130 and the MS 140.

The ARQ scheme may be sub-divided to a synchronous acknowledged transmission and an asynchronous acknowledged transmission. According to the synchronous acknowledged transmission, the BS, the RS, and the MS each should know in which physical frame it transmits and receives the ACK/NACK. Exemplary embodiments of the present invention provide a technique for determining the transmission time and the reception time of the ACK/NACK. Hereinafter, a Hybrid ARQ (HARQ) scheme is described by way of example. However, the present invention is applicable to any other ARQ scheme.

Figure 2:
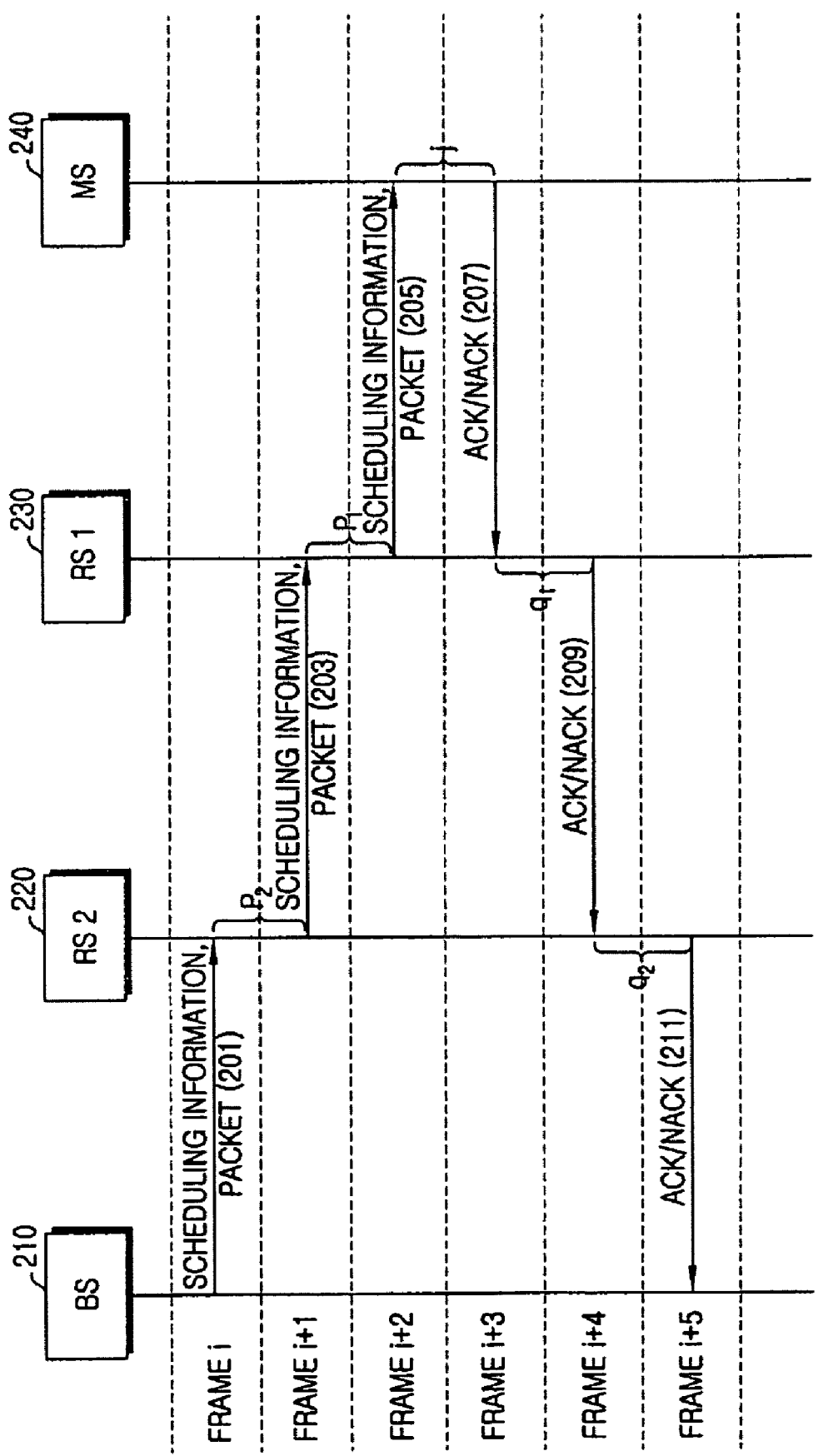
FIG. 2 illustrates exchanges of ACKnowledge (ACK)/Non ACK (NACK) in a downlink packet transmission in a multihop relay wireless communication system according to an exemplary embodiment of the present invention.

FIG. 2 illustrates exchanges of ACK/NACK in a DL packet transmission in a multihop relay wireless communication system according to an exemplary embodiment of the present invention. More particularly, FIG. 2 illustrates exchanges of a DL packet and an ACK/NACK between a BS 210 and an MS 240 in 3-hop communications. Even when the number of hops changes, the DL packet and the ACK/NACK are exchanged the same as illustrated in FIG. 2.

In step 201, the BS 210 transmits scheduling information and a packet to a second RS 220 in a frame i. Herein, the scheduling information can be a map message indicative of resource allocation information. The packet, which conforms to the HARQ scheme, includes data and a Cyclic Redundancy Check (CRC) for error checking.

Upon receiving the scheduling information and the packet in the frame i, the second RS 220 processes the DL data during a time $p_2$ and relays the scheduling information and the packet to the first RS 230 in a frame i+1 in step 203. Herein, $p_2$ denotes a DL data processing delay time of the second RS 220. In more detail, $p_2$ is a delay time taken for the second RS 220 to decode the received packet and check for an error before the retransmission. $p_2$ varies depending on the performance and the characteristics of the second RS 220. In FIG. 2, $p_2$ is assumed to equal to a time occupied by one frame.

Upon receiving the scheduling information and the packet in the frame i+1, the first RS 230 processes the DL data during a time $p_1$ and relays the scheduling information and the packet to the MS 240 over a frame i+2 in step 205. $p_1$ is a delay time taken for the first RS 230 to decode the received packet and check for an error before the retransmission. $p_1$ varies depending on the performance and the characteristics of the first RS 230. In FIG. 2, $p_1$ is assumed to equal to a time occupied by one frame.

Receiving the scheduling information and the packet over the frame i+2, the MS 240 checks for an error associated with the packet during a time j and sends an ACK/NACK to the first RS 230 in a frame i+3 in step 207. More specifically, the MS 240 sends ACK when the packet has no error, and sends NACK when there is an error associated with the packet. Herein, j denotes an ACK/NACK transmission delay time of the MS 240. More particularly, j denotes a delay time taken to decode the received packet and check for an error before the ACK/NACK is transmitted. j varies depending on the performance and the characteristics of the MS. In FIG. 2, j is assumed to equal to a time occupied by one frame.

The first RS 230, receiving the ACK/NACK in the frame i+3, processes the ACK/NACK for a time $q_1$ and relays the ACK/NACK to the second RS 220 over a frame i+4 in step 209. Herein, $q_1$ denotes the ACK/NACK processing delay time of the first RS 230 and varies depending on the performance and the characteristics of the first RS 230. In FIG. 2, $q_1$ is assumed to equal to a time occupied by one frame. It is further noted that since $p_1$ and $q_1$ are both associated with first RS 230, they may substantially be the same. However, $p_1$ and $q_1$ may also differ.

Upon receiving the ACK/NACK over the frame i+4, the second RS 220 processes the ACK/NACK for a time $q_2$ and relays the ACK/NACK to the BS 210 in a frame i+5 in step 211. Herein, $q_2$ denotes the ACK/NACK processing delay time of the second RS 220 and varies depending on the performance and the characteristics of the second RS 220. In FIG. 2, $q_2$ is assumed to equal to a time occupied by one frame. It is further noted that since $p_2$ and $q_2$ are both associated with second RS 220, they may substantially be the same. However, $p_2$ and $q_2$ may also differ.

As described above, to control the transmission and the reception of the DL packet and the ACK/NACK of the DL packet, the BS needs to schedule the transmission and the reception of the ACK/NACK. For doing so, the BS should know ACK/NACK information sent from the RSs and the MS. Also, the RSs should know the accurate time information of the ACK/NACK transmission. For instance, in FIG. 2, the second RS 220 receiving the packet over the frame i needs to know the transmission of the ACK/NACK after five frames, that is, in the frame i+5. The first RS 230 receiving the packet over the frame i+1 needs to know the transmission of the ACK/NACK after three frames, that is, in the frame i+4.

The exemplary embodiment of present invention calculates the ACK/NACK transmission time based on Equation (1).

$$n_{RS_H} = \sum_{h=1}^{H}(p_h + q_h) + j \quad (1)$$

In Equation (1), $^nRS_H$ denotes a time interval between a DL packet reception time of the corresponding RS and an ACK/NACK transmission time of the DL packet, H denotes the number of hops between the corresponding RS and the MS, $p_h$ denotes a DL data processing delay time of the RS of which the number of hops from the MS is h, $q_h$ denotes an ACK/NACK processing delay time of the RS of which the number of hops from the MS is h, and j denotes an ACK/NACK transmission delay time of the MS. When the frame is used as a unit of $p_h$, $q_h$, j and in Equation (1), $^nRS_H$ has a value in the unit of the frame. In this case, after receiving the DL packet, the RS sends ACK/NACK when $^nRS_H$ frames elapses.

The ACK/NACK transmission time calculated based on Equation (1) is used for the scheduling of the BS and the ACK/NACK transmission of the RS. The ACK/NACK transmission time information is calculated by the BS and provided to the RSs, or calculated by the RS. Hereafter, the values necessary to calculate the ACK/NACK transmission time, such as $p_h$ and $q_h$ in Equation (1), are referred to as retransmission parameter values.

Since the retransmission parameter values are the data or ACK processing delay time at the RS, they may vary per RS. Hence, the retransmission parameter values are forwarded from the RS to the BS through a network entry procedure or a capability negotiation procedure of the RS. Yet, when the RSs in the wireless communication system have the same retransmission parameter values, the collecting of the retransmission parameter values from the RSs and the forwarding of the retransmission parameter values to the RSs may not be performed. In this situation, the BS and the RS already know the retransmission parameter values as system variables.

The ACK/NACK transmission time is calculated at the BS or the RS. The BS calculates the ACK/NACK transmission time using the retransmission parameter values gathered through the network entry procedure or the capability negotiation procedure of the RSs and provides the calculated ACK/NACK transmission time to the RSs. The BS provides when or which frame each RS sends the ACK/NACK using control or scheduling information such as DL/UL map or management message that is transmitted from BS to each RS.

According to an exemplary embodiment of present invention, the first RS 220 receives the DL map and HARQ data in frame i, the BS 210 informs a value 'n' which is included in DL MAP. Herein, the value 'n' represents a frame offset or an absolute frame number. If the value 'n' represents the frame offset, the first RS 220 sends ACK/NACK in frame i+n corresponding HARQ data received in frame i. In this case, the value 'n' is described as 'ACK_frame_delay'. Else the value 'n' represents the absolute frame number, the first RS 220 sends ACK/NACK in frame n corresponding HARQ data received in frame i.

According to another embodiment of present invention, the first RS 220 receives the DL map and HARQ data in frame i from the BS 210. The BS 210 schedules UL ACK/NACK region in frame k using UL map which includes a value 'n'. Herein, the value 'n' represents a frame offset or an absolute frame number. If the value 'n' represents the frame offset, that is, 'n' is difference between k and i, the first RS 220 sends ACK/NACK in frame k corresponding HARQ data received in frame k-n. Else the value 'n' represents the absolute frame number, that is, 'n' is i, the first RS 220 sends ACK/NACK in frame k corresponding HARQ data received in frame i.

In contrast, when the RS calculates the ACK/NACK transmission time, the BS provides the gathered retransmission parameter values of the RSs to the RSs and the RSs calculate their ACK/NACK transmission time. For example, the first RS 220 does not know retransmission parameters of the second RS 230 and MS 240. Therefore, the BS 210 informs the retransmission parameters the first RS 220 using control or scheduling information such as DL map or UL map or management message. Then the first RS 220 can calculate when or which frame the first RS 220 sends ACK/NACK corresponding HARQ data received in frame i.

Figure 3:
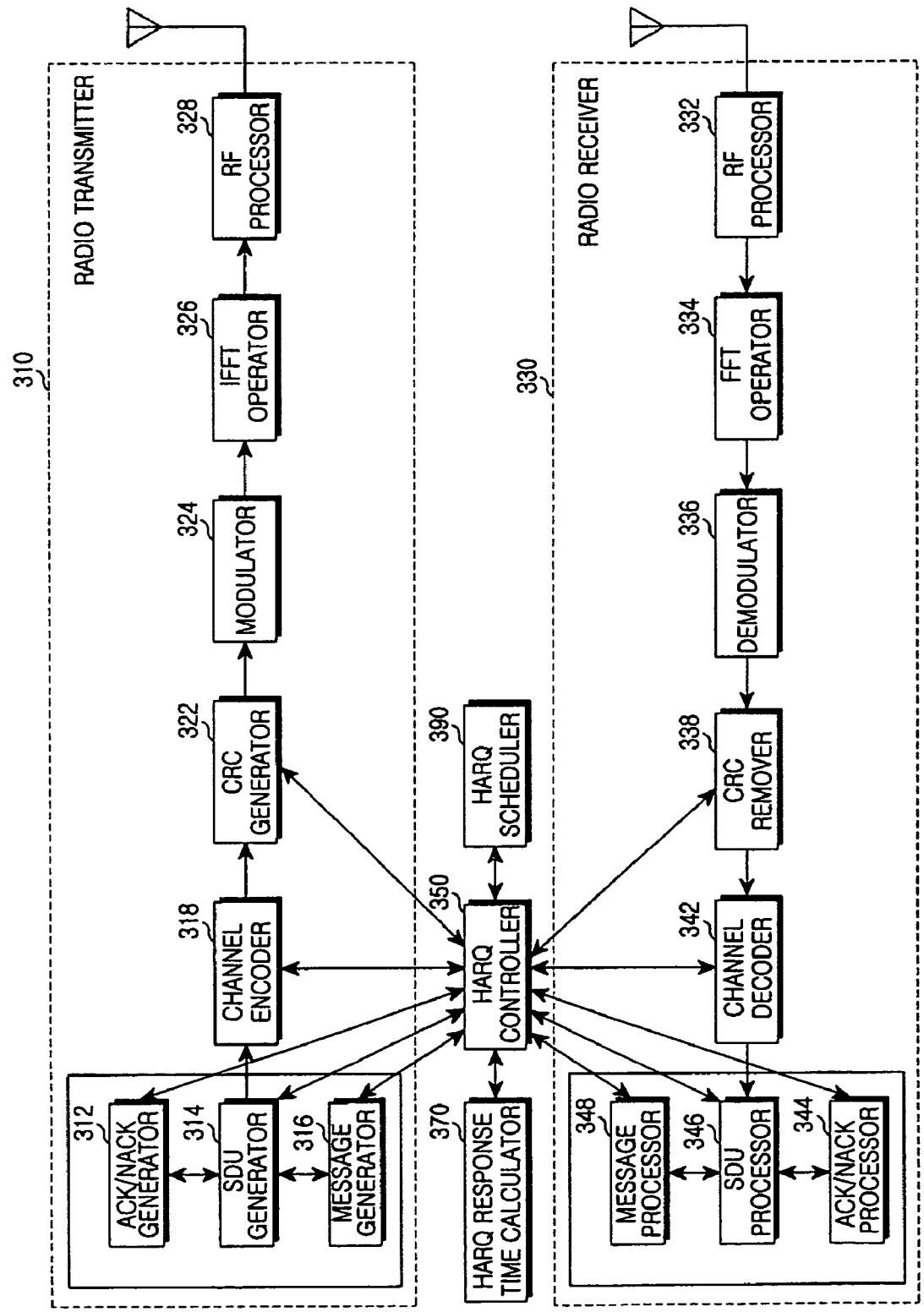
FIG. 3 is a block diagram of a base station and a relay station in the multihop relay wireless communication system according to an exemplary embodiment of the present invention.

FIG. 3 is a block diagram of the BS and the RS in the multihop relay wireless communication system according to an exemplary embodiment of the present invention.

The BS and the RS of FIG. 3 include a radio transmitter 310, a radio receiver 330, a HARQ controller 350, a HARQ response time calculator 370, and a HARQ scheduler 390.

The radio transmitter 310 includes an ACK/NACK generator 312, a Service Data Unit (SDU) generator 314, a message generator 316, a channel encoder 318, a CRC generator 322, a modulator 324, an Inverse Fast Fourier Transform (IFFT) operator 326, and a Radio Frequency (RF) processor 328.

The ACK/NACK generator 312 generates and provides an ACK or a NACK to the SDU generator 314 under the control of the HARQ controller 350. The SDU generator 314 constitutes a data block for a physical layer transmission. The message generator 316 generates a control message to be sent to an external node. The channel encoder 318 encodes the physical-layer data block output from the SDU generator 314 according to a corresponding coding scheme. The CRC generator 322 generates an error detecting code and appends the error detecting code to the encoded bit stream output from the channel encoder 314. The modulator 324 converts the bit stream into complex symbols by modulating the bit stream output from the CRC generator 322 according to a corresponding modulation scheme. The IFFT operator 326 arranges the complex symbols output from the modulator 324 in a frequency domain and converts them into time-domain OFDM symbols through the IFFT operation. The RF processor 328 up-converts the baseband signal output from the IFFT operator 326 into an RF signal and transmits the RF signal via an antenna.

The radio receiver 330 includes an RF processor 332, an FFT operator 334, a demodulator 336, a CRC remover 338, a channel decoder 342, an ACK/NACK processor 344, an SDU processor 346, and a message processor 348.

The RF processor 332 down-converts an RF signal received on an antenna into a baseband signal. The FFT operator 334 divides the signal output from the RF processor 332 into OFDM symbols and converts them into frequency-domain complex symbols through the FFT operation. The demodulator 336 converts the complex symbols output from the FFT operator 334 into a bit stream by demodulating the complex symbols according to a corresponding modulation scheme. The CRC remover 338 determines whether or not there is an error associated with the packet using the error detecting code of the bit stream output from the demodulator 336, and informs the HARQ controller 350 of the result of the determination. The CRC remover 338 removes the error detecting code from the bit stream. The channel decoder 342 decodes the bit stream output from the CRC remover 338 according to a corresponding coding scheme.

The ACK/NACK processor 344 confirms the receipt of an ACK or NACK and informs the HARQ controller 350 of the receipt. That is, the ACK/NACK processor 344 informs the HARQ controller 350 of whether or not there is an error associated with the transmitted packet. In other words, the ACK/NACK processor 344 informs the HARQ controller 350 of whether the correspondent node successfully receives the packet or not. The SDU processor 346 splits the physical-layer data block output from the channel decoder 342 into a data and a control message, and provides the control message to the message processor 348. The message processor 348 interprets the control message received from the external node.

The HARQ controller 350 controls the functions for executing the HARQ scheme. For instance, the HARQ controller 350 controls the HARQ response time calculator 370 to calculate the ACK/NACK transmission time of the RSs and controls the HARQ scheduler 390 to perform the scheduling for the HARQ scheme. The HARQ controller 350 provides control information for the HARQ scheme determined at the HARQ scheduler 390 to the message generator 316, and controls the message generator 316 to generate a control message including the control information. The HARQ controller 350 controls the ACK/NACK generator 312 to generate an ACK or a NACK according to whether the CRC remover 338 detects an error associated with the packet.

The HARQ response time calculator 370 calculates the ACK/NACK transmission time of the RSs. Herein, the ACK/NACK transmission time indicates a frame offset between the map reception time and the ACK/NACK transmission time of the corresponding RS. The HARQ scheduler 390 performs the scheduling for the sake of the packet transmission, the packet retransmission, the control message transmission, and the control message retransmission according to the HARQ scheme. More specifically, the HARQ scheduler 390 constitutes field values to be included in the DL map or the UL map using the ACK/NACK transmission time information calculated at the HARQ response time calculator 370, and thus allocates DL or UL radio resources to transmit the ACK/NACK.

Operations of the BS constructed as illustrated in FIG. 3 are described below.

In the BS according to one exemplary embodiment of the present invention, the HARQ response time calculator 370 calculates the ACK/NACK transmission time of the RSs using the retransmission parameter values. Herein, the HARQ response time calculator 370 calculates the ACK/NACK transmission time based on Equation (1). The HARQ scheduler 390 allocates the radio resource for the HARQ packet. The HARQ controller 350 provides the ACK/NACK transmission time information and the resource allocation information of the HARQ packet to the message generator 316. The message generator 316 generates a map message including the ACK/NACK transmission time information. Herein, the form of the ACK/NACK transmission time information differs in various exemplary embodiments of the present invention. For example, the form of the ACK/NACK transmission time information can be a frame offset or an absolute frame number. The retransmission parameter values necessary for the HARQ response time calculator 370 to calculate the ACK/NACK transmission time can be received from the RSs or are known in advance. When the retransmission parameter values of the RSs in the system are all the same, a separate function of acquiring the retransmission parameter values is not needed because the retransmission parameter values are already known. When the retransmission parameter values are received from the RSs, the radio receiver 330 receives the retransmission parameter values in the network entry procedure or the capability negotiation procedure of the RS and provides the retransmission parameter values to the HARQ controller 350.

In the BS according to another exemplary embodiment of the present invention, the HARQ controller 350 controls the radio transmitter 310 to send the retransmission parameter values necessary for the ACK/NACK transmission time calculation to each RS. In doing so, the retransmission parameter values can be received from the RSs or are known in advance, similar to the exemplary embodiment described above.

In the BS according to exemplary embodiments of the present invention, the message generator 316 generates UL map including ACK/NACK transmission region allocation information. The ACK/NACK transmission region allocation information is included in the UL map and indicates a resource region for carrying the ACK/NACK of the RS. The ACK/NACK transmission region allocation information can be constituted as an Information Element (IE) named 'ACK-CH_Region_Allocation_IE'. The ACK/NACK transmission region allocation information includes frame offset information informing of which frame carries a packet to which the ACK/NACK to be transmitted through the indicated resource pertains. Alternatively, instead of the offset information, one of an absolute frame number, a Connection IDentifier (CID) of the RS or the MS, and Arq Channel ID (ACID) or Sub Packet ID (SPID) of the HARQ packet can be used.

Now, operations of the RS constructed as shown in FIG. 3 are explained.

In the RS according to one exemplary embodiment of the present invention, the radio receiver 330 receives the ACK/NACK transmission time information from the BS and provides the received ACK/NACK transmission time information to the HARQ controller 350. The ACK/NACK transmission time information is included in the map message informing of the resource allocation information of the corresponding packet. Herein, the form of the ACK/NACK transmission time information differs according to various embodiments of the present invention. For example, the form of the ACK/NACK transmission time information can be a frame offset or an absolute number of the frame. The HARQ controller 350 controls the radio transmitter 310 to send the ACK/NACK of the corresponding packet according to the received ACK/NACK transmission time information. Since the RS does not calculate the ACK/NACK transmission time information in one exemplary embodiment of the present invention, the HARQ response time calculator 370 is not provided in the RS. When the RS needs to transmit its retransmission parameter values, the radio transmitter 310 sends the retransmission parameter values to the BS in the network entry procedure or the capability negotiation procedure.

In the RS according to another exemplary embodiment of the present invention, the radio receiver 330 receives the retransmission parameter values of the other RSs from the BS and provides the received retransmission parameter values to the HARQ controller 350. The HARQ response time calculator 370 calculates its ACK/NACK transmission time using the retransmission parameter values of the other RSs provided from the HARQ controller 350. Herein, the HARQ response time calculator 370 calculates the ACK/NACK transmission time based on Equation (1). The HARQ controller 350 controls the radio transmitter 310 to send the ACK/NACK of the corresponding packet according to the ACK/NACK transmission time.

In the RS according to one or another embodiment of the present invention, the radio receiver 330 receives ACK/NACK transmission region allocation information. The ACK/NACK transmission region allocation information is included in the UL map and indicates a resource region for carrying the ACK/NACK of the RS. The ACK/NACK transmission region allocation information can be constituted as an IE named 'ACKCH Region_Allocation_IE'. The ACK/NACK transmission region allocation information includes frame offset information informing of which frame carries a packet to which the ACK/NACK to be transmitted through the indicated resource pertains. Alternatively, instead of the offset information, one of an absolute frame number, a CID of the RS or the MS, and ACID or SPID of the HARQ packet can be used. The controller 350 controls the radio transmitter 310 to send the ACK/NACK of the corresponding packet according to the ACK/NACK transmission region allocation information.

Figure 4:
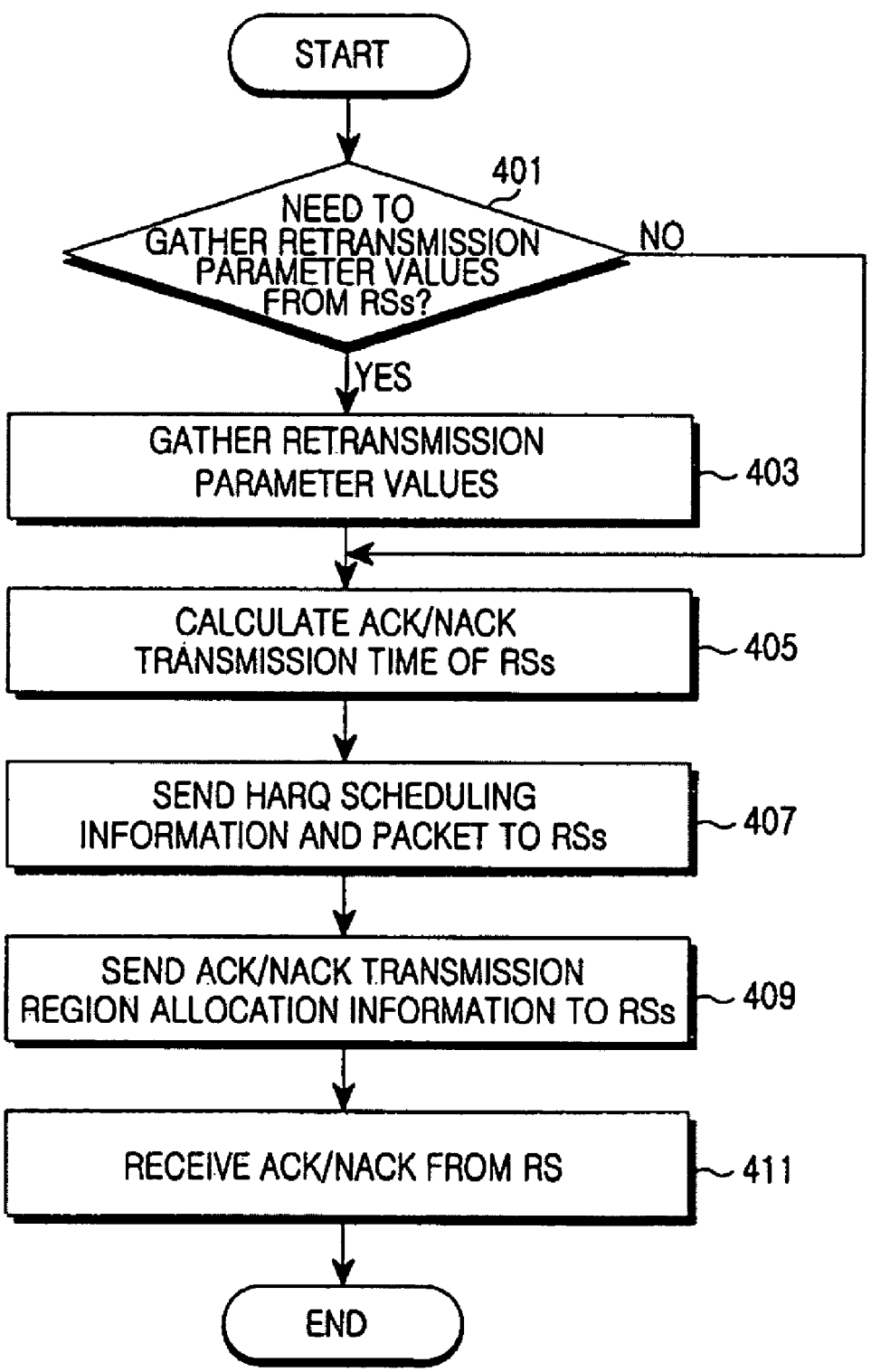
FIG. 4 illustrates operations of the base station in the multihop relay wireless communication system according to an exemplary embodiment of the present invention.

FIG. 4 illustrates the operations of the BS in the multihop relay wireless communication system according to an exemplary embodiment of the present invention.

In step 401, the BS determines whether it is necessary to gather the retransmission parameter values from the RSs. That is, the BS determines whether all the retransmission parameter values of the RSs in the system are the same. Herein, the retransmission parameter values include the UL data processing delay time of the RS, the DL data processing delay time of the RS, the ACK/NACK transmission delay time of the RS, the ACK/NACK transmission delay time of the BS, and the ACK/NACK transmission delay time of the MS. When it is not necessary to collect the retransmission parameter values, the process proceeds to step 405.

When it is necessary to collect the retransmission parameter values, that is, when the retransmission parameter values of the RSs in the system are not the same, the BS gathers the retransmission parameter values of the RSs in step 403. Herein, the BS collects the retransmission parameter values of the RS through the network entry procedure or the capability negotiation procedure of the RS.

In step 405, the BS calculates the ACK/NACK transmission time of the RSs. For example, the BS calculates the ACK/NACK transmission time of the DL packet based on Equation (1).

In step 407, the BS transmits HARQ scheduling information and a packet to the RSs. The HARQ scheduling information is transmitted in the form of the HARQ DL map and includes frame offset information informing of the ACK/NACK transmission time. The frame offset information indicates how many frames later the ACK/NACK is transmitted after the RS receives the HARQ DL/UL map or the packet. Alternatively, instead of the offset information, the absolute frame number can be used to inform of the ACK/NACK transmission time.

In step 409, the BS transmits ACK/NACK transmission region allocation information to the RSs. The ACK/NACK transmission region allocation information is included in the UL map and indicates the resource region for carrying the ACK/NACK of the RS. The ACK/NACK transmission region allocation information can be constituted as an IE named 'ACKCH_Region_Allocation_IE'. The ACK/NACK transmission region allocation information includes frame offset information informing of which frame carries a packet to which the ACK/NACK to be transmitted through the indicated resource pertains. Alternatively, instead of the offset information, one of an absolute frame number, a CID of the RS or the MS, and an ACID or an SPID of the HARQ packet can be used.

In step 411, the BS receives an ACK/NACK from the RS over the ACK/NACK transmission region allocated by its scheduling.

In FIG. 4, the HARQ scheduling information includes the ACK/NACK transmission time information and the ACK/NACK transmission region allocation information includes the information of the corresponding packet. Alternatively, the HARQ scheduling information may not include the ACK/NACK transmission time information, or the ACK/NACK transmission region allocation information may not include the information of the corresponding packet.

Figure 5:
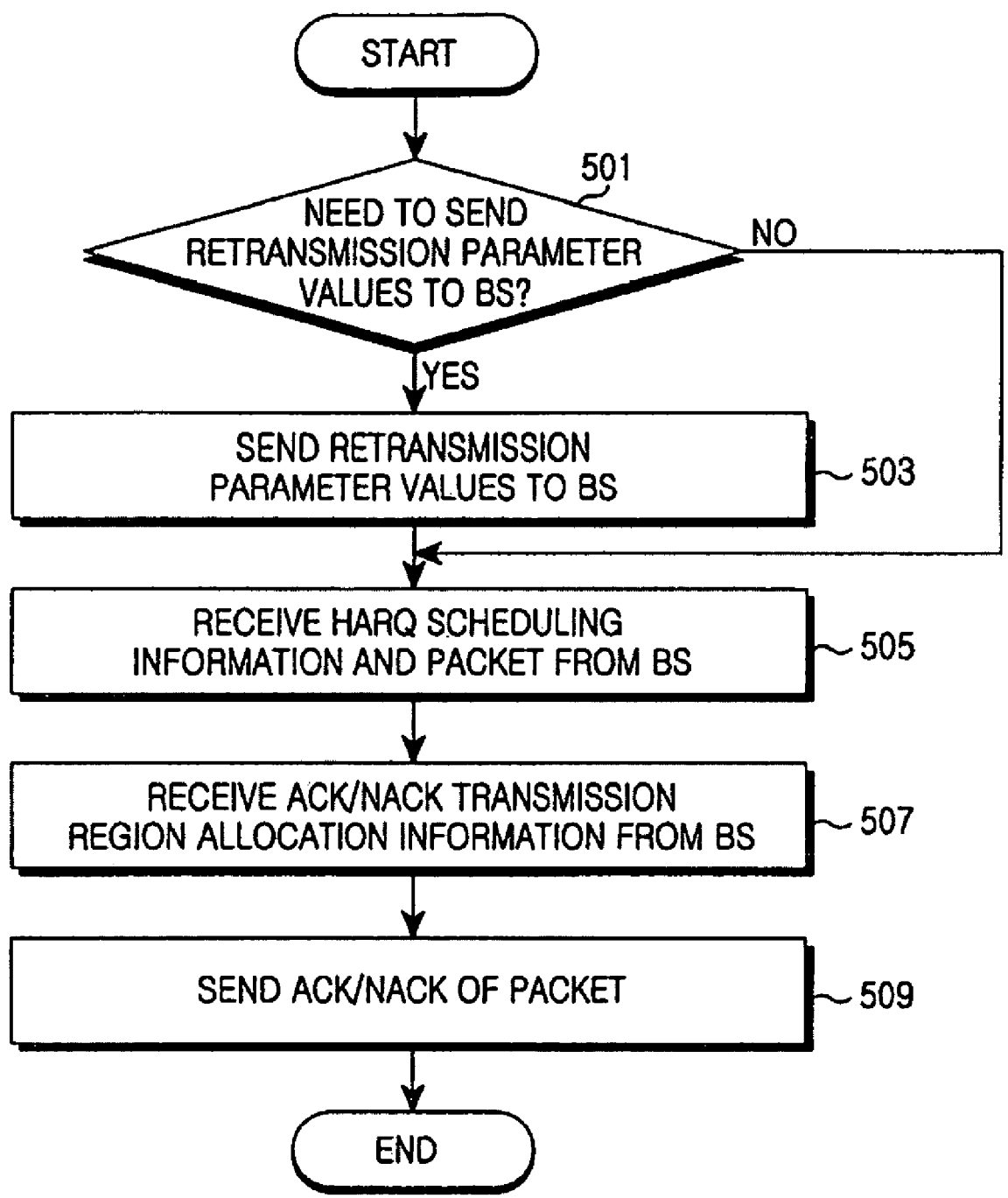
FIG. 5 illustrates operations of the relay station in the multihop relay wireless communication system according to an exemplary embodiment of the present invention.

FIG. 5 illustrates the operations of the RS in the multihop relay wireless communication system according to an exemplary embodiment of the present invention.

In step 501, the RS determines whether it is necessary to transmit its retransmission parameter values to the BS. In other words, the RS determines whether all the retransmission parameter values of the RSs in the system are the same. Herein, the retransmission parameter values include the UL data processing delay time of the RS, the DL data processing delay time of the RS, the ACK/NACK transmission delay time of the RS, the ACK/NACK transmission delay time of the MS, and the ACK/NACK transmission delay time of the BS. When it is not necessary to collect the retransmission parameter values, the process proceeds to step 505.

When it is necessary to transmit the retransmission parameter values, that is, when the retransmission parameter values of the RSs in the system are not the same, the RS transmits its retransmission parameter values to the BS in step 503. The RS sends the retransmission parameter values in the network entry procedure or the capability negotiation procedure. The transmitted retransmission parameter values include the UL data processing delay time, the DL data processing delay time, and the ACK/NACK transmission delay time of the RS.

In step 505, the RS receives HARQ scheduling information and a packet from the BS. Herein, the HARQ scheduling information is transmitted in the form of the HARQ DL map and includes frame offset information informing of the ACK/NACK transmission time. The frame offset information indicates how many frames later the ACK/NACK is transmitted after the RS receives the HARQ DL map or the packet. Alternatively, instead of the offset information, an absolute frame number can be used to inform of the ACK/NACK transmission time. Although it is not illustrated in FIG. 5, the RS determines is there is an error associated with the packet.

In step 507, the RS receives ACK/NACK transmission region allocation information from the BS. The ACK/NACK transmission region allocation information is included in the UL map and indicates a resource region for carrying the ACK/NACK of the RS. The ACK/NACK transmission region allocation information can be constituted as an IE named 'ACKCH_Region_Allocation_IE'. The ACK/NACK transmission region allocation information includes frame offset information informing of which frame carries a packet to which the ACK/NACK to be transmitted through the indicated resource pertains. Alternatively, instead of the offset information, one of an absolute frame number, a CID of the RS or the MS, and an ACID or an SPID of the HARQ packet can be used.

In step 509, the RS sends an ACK/NACK over the ACK/NACK transmission region according to the information received in step 507.

In FIG. 5, the HARQ scheduling information includes the ACK/NACK transmission time information and the ACK/NACK transmission region allocation information includes the information of the corresponding packet. Alternatively, the HARQ scheduling information may not include the ACK/NACK transmission time information, or the ACK/NACK transmission region allocation information may not include the information of the corresponding packet.

Figure 6:
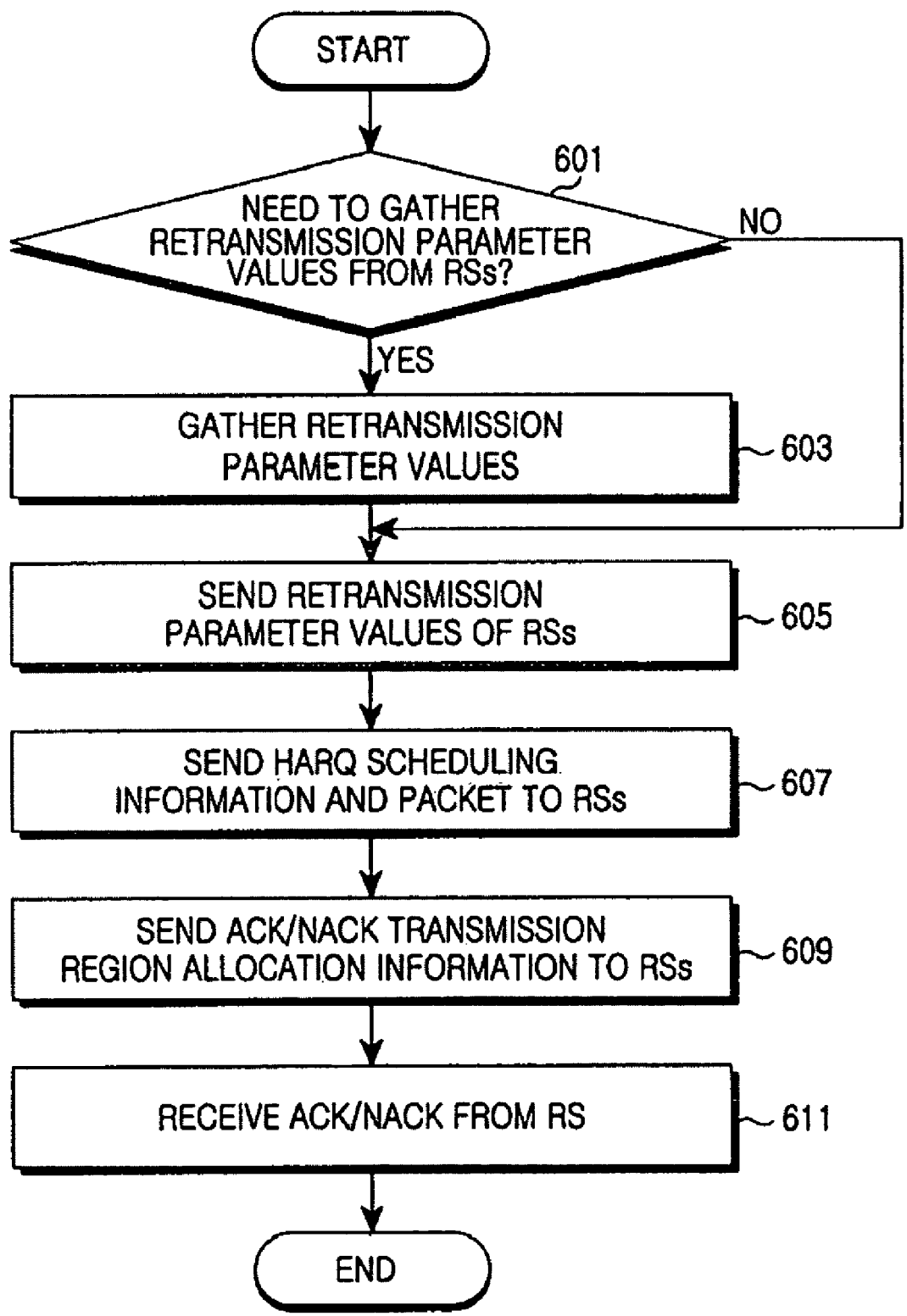
FIG. 6 illustrates operations of the base station in the multihop relay wireless communication system according to an exemplary embodiment of the present invention.

FIG. 6 illustrates operations of the BS in the multihop relay wireless communication system according to an exemplary embodiment of the present invention.

In step 601, the BS determines whether it is necessary to gather the retransmission parameter values from the RSs. That is, the BS checks whether all the retransmission parameter values of the RSs in the system are the same. Herein, the retransmission parameter values include the UL data processing delay time of the RS, the DL data processing delay time of the RS, the ACK/NACK transmission delay time of the RS, the ACK/NACK transmission delay time of the BS, and the ACK/NACK transmission delay time of the MS. When it is not necessary to collect the retransmission parameter values, the process proceeds to step 605.

When it needs to collect the retransmission parameter values, that is, when the retransmission parameter values of the RSs in the system are not the same, the BS gathers the retransmission parameter values of the RSs in step 603. Herein, the BS collects the retransmission parameter values of the RS through the network entry procedure or the capability negotiation procedure of the RS.

In step 605, the BS transmits the collected retransmission parameter values of the RSs to the respective RSs.

In step 607, the BS transmits HARQ scheduling information and a packet to the RSs. The HARQ scheduling information is transmitted in the form of the HARQ DL map.

In step 609, the BS transmits ACK/NACK transmission region allocation information to the RSs. The ACK/NACK transmission region allocation information is included in the UL map and indicates the resource region for carrying the ACK/NACK of the RS. The ACK/NACK transmission region allocation information can be constituted as an IE named 'ACKCH_Region_Allocation_IE'. The ACK/NACK transmission region allocation information includes frame offset information informing of which frame carries a packet to which the ACK/NACK to be transmitted through the indicated resource pertains. Alternatively, instead of the offset information, one of an absolute frame number, a CID of the RS or the MS, and an ACID or an SPID of the HARQ packet can be used.

In step 611, the BS receives an ACK/NACK from the RS over the ACK/NACK transmission region allocated by its scheduling.

In FIG. 6, the ACK/NACK transmission region allocation information includes the information of the corresponding packet. Alternatively, the ACK/NACK transmission region allocation information may not include the information of the corresponding packet.

Figure 7:
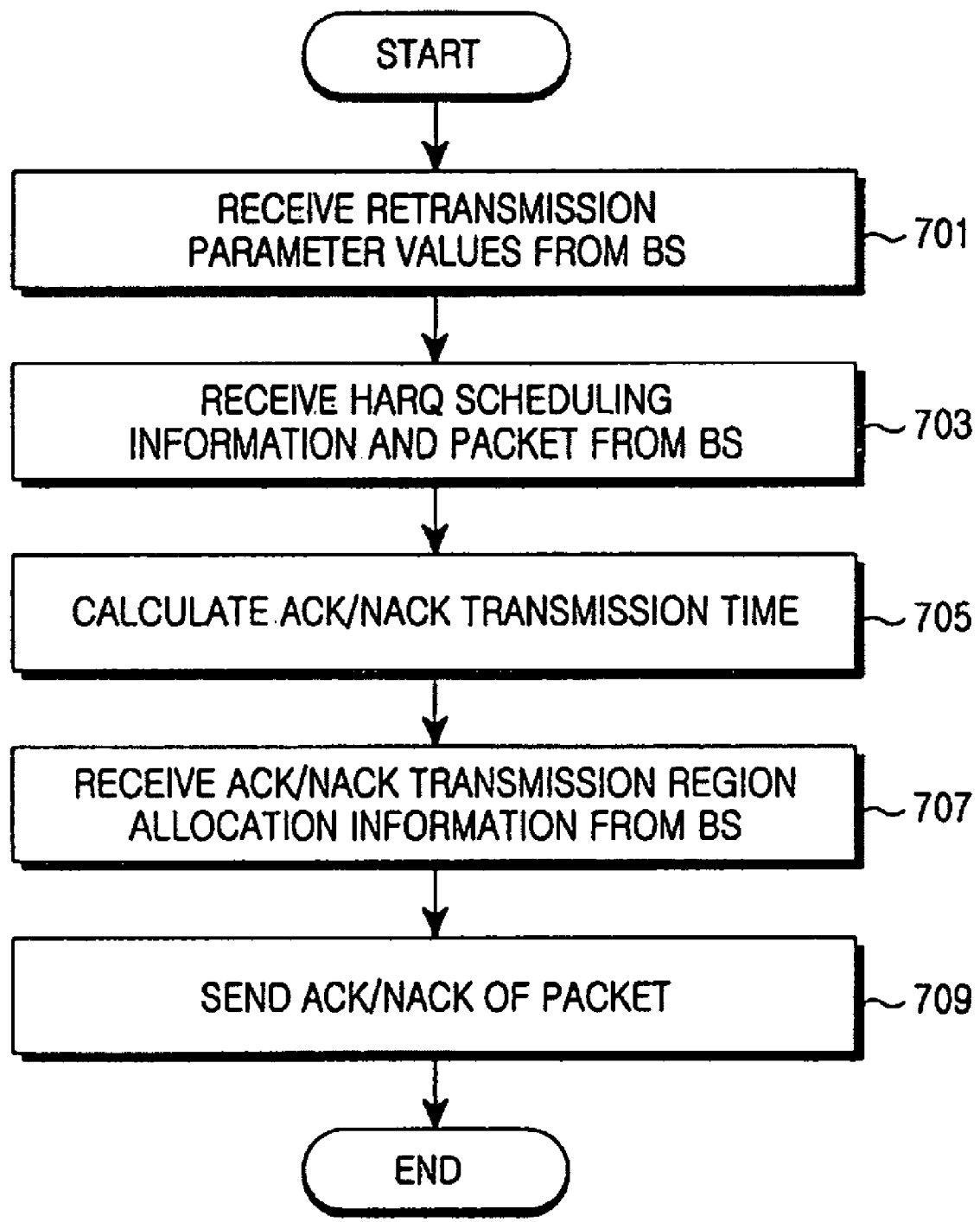
FIG. 7 illustrates operations of the relay station in the multihop relay wireless communication system according to an exemplary embodiment of the present invention.

FIG. 7 illustrates operations of the RS in the multihop relay wireless communication system according to an exemplary embodiment of the present invention.

In step 701, the RS receives retransmission parameter values from the BS. Herein, the retransmission parameter values include the UL data processing delay time of the RS, the DL data processing delay time of the RS, the ACK/NACK transmission delay time of the RS, the ACK/NACK transmission delay time of the BS, and the ACK/NACK transmission delay time of the MS.

In step 703, the RS receives HARQ scheduling information and a packet from the BS. Herein, the HARQ scheduling information is transmitted in the form of the HARQ DL map. Although it is not illustrated in FIG. 7, the RS checks for an error associated with the packet.

In step 705, the RS calculates its ACK/NACK transmission time. For example, the RS calculates the ACK/NACK transmission time of the DL packet based on Equation (1).

In step 707, the RS receives ACK/NACK transmission region allocation information from the BS. The ACK/NACK transmission region allocation information is included in the UL map and indicates a resource region for carrying the ACK/NACK of the RS. The ACK/NACK transmission region allocation information can be constituted as an IE named 'ACKCH_Region_Allocation_IE'. The ACK/NACK transmission region allocation information includes frame offset information informing of which frame carries a packet to which the ACK/NACK to be transmitted through the indicated resource pertains. Alternatively, instead of the offset information, one of an absolute frame number, a CID of the RS or the MS, and an ACID or an SPID of the HARQ packet can be used.

In step 709, the RS sends ACK/NACK of the corresponding packet according to the ACK/NACK transmission time information calculated in step 705. Alternatively, the RS may not calculate the ACK/NACK transmission time, or the ACK/NACK transmission region allocation information may not include the information of the corresponding packet.

In FIG. 7, the RS calculates the ACK/NACK transmission time and the ACK/NACK transmission region allocation information includes the information of the corresponding packet. Alternatively, the RS may not calculate the ACK/NACK transmission time, or the ACK/NACK transmission region allocation information may not include the information of the corresponding packet.

As set forth above, in the multihop relay wireless communication system, the ACK/NACK transmission time of the RS is calculated using the processing delay times of the RS, the BS, and the MS. Therefore, the ARQ scheme can be applied to the multihop relay wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for a Base Station (BS) in a multihop relay wireless communication system based on a centralized scheduling, the apparatus comprising:
a calculator for calculating a time interval which specifies when a Relay Station (RS) transmits an ACKnowledge (ACK)/Non ACK (NACK) and for providing a transmitter with information on the time interval, wherein the time interval is expressed in units of frames and is calculated using:
a DownLink (DL) data processing delay time within the RS and a DL data processing delay time within each of any other RS between the RS and a Mobile Station (MS),
an ACK/NACK transmission delay time within the MS, and
an ACK/NACK processing delay time within the RS and an ACK/NACK processing delay time within each of any other RS between the RS and the MS; and
the transmitter for transmitting the information on the time interval to the RS, the information on the time interval comprising one of:
a frame offset between a first frame at which the RS receives the packet and a second frame at which the RS transmits the ACK/NACK,
a frame offset between a third frame at which the RS receives the ACK/NACK scheduling information and the second frame at which the RS transmits the ACK/NACK, and
an absolute frame number of the second frame at which the RS transmits the ACK/NACK.

2. The apparatus of claim 1, further comprising:
a receiver for receiving the DL data processing delay time of the RS from the RS when the RS performs one of a network entry procedure and a capability negotiation procedure.

3. The apparatus of claim 1, further comprising:
a generator for generating a map message which comprises the information on the time interval.

4. The apparatus of claim 1, further comprising:
a generator for generating ACK/NACK transmission region allocation information which comprises information for identifying a packet corresponding to the time interval,
wherein the information for identifying the packet is at least one of a frame offset between a frame carrying the ACK/NACK transmission region allocation information and a frame carrying the packet, an absolute frame number of the frame carrying the packet, a Connection IDentifier (CID), an Arq Channel ID (ACID), and a Sub Packet ID (SPID).

5. The apparatus of claim 1, wherein the DL data processing delay time and the ACK/NACK processing delay time is the same for at least one of the RS and any other RS between the RS and the MS.

6. An apparatus for a Relay Station (RS) in a multihop relay wireless communication system based on a centralized scheduling, the apparatus comprising:
a receiver for receiving information on a time interval that originated at a Base Station (BS), wherein the time interval specifies when the RS transmits an ACKnowledge (ACK)/Non ACK (NACK); and
a transmitter for transmitting the ACK/NACK in relation to a packet corresponding to the information on the time interval in a frame indicated by the information on the time interval,
wherein the information on the time interval comprises one of:
a frame offset between a first frame at which the RS receives the packet and a second frame at which the RS transmits the ACK/NACK,
a frame offset between a third frame at which the RS receives the ACK/NACK scheduling information and the second frame at which the RS transmits the ACK/NACK, and
an absolute frame number of the second frame at which the RS transmits the ACK/NACK, and
wherein the time interval is expressed in units of frames and is calculated using:
a DownLink (DL) data processing delay time within the RS and a DL data processing delay time within each of any other RS between the RS and a Mobile Station (MS),
an ACK/NACK transmission delay time within the MS, and
an ACK/NACK processing delay time within the RS and an ACK/NACK processing delay time within each of any other RS between the RS and the MS.

7. The apparatus of claim 6, wherein the transmitter transmits the DL data processing delay time of the RS in one of a network entry procedure and a capability negotiation procedure.

8. The apparatus of claim 6, further comprising:
a processor for confirming the information on the time interval through a map message which comprises resource allocation information of the packet.

9. The apparatus of claim 6, further comprising:
a processor for confirming information for identifying the packet in ACK/NACK transmission region allocation information,
wherein the information for identifying the packet is at least one of a frame offset between a frame carrying the ACK/NACK transmission region allocation information and a frame carrying the packet, an absolute frame number of the frame carrying the packet, a Connection IDentifier (CID), an Arq Channel ID (ACID), and a Sub Packet ID (SPID).

10. The apparatus of claim 6, wherein the DL data processing delay time and the ACK/NACK processing delay time is the same for at least one of the RS and any other RS between the RS and the MS.

11. An operating method of a Base Station (BS) in a multihop relay wireless communication system based on a centralized scheduling, the method comprising:
calculating a time interval which specifies when a Relay Station (RS) transmits an ACKnowledge (ACK)/Non ACK (NACK), wherein the time interval is expressed in units of frames and is calculated using:
a DownLink (DL) data processing delay time within the RS and a DL data processing delay time within each of any other RS between the RS and a Mobile Station (MS),
an ACK/NACK transmission delay time within the MS, and
an ACK/NACK processing delay time within the RS and an ACK/NACK processing delay time within each of any other RS between the RS and the MS; and
transmitting information on the time interval to the RS, the information on the time interval comprising one of:

a frame offset between a first frame at which the RS receives the packet and a second frame at which the RS transmits the ACK/NACK, a frame offset between a third frame at which the RS receives the ACK/NACK scheduling information and the second frame at which the RS transmits the ACK/NACK, and an absolute frame number of the second frame at which the RS transmits the ACK/NACK.

12. The method of claim 11, further comprising:
receiving the DL data processing delay time of the RS when the RS performs one of a network entry procedure and a capability negotiation procedure.

13. The method of claim 11, wherein the information on the time interval is included in a map message.

14. The method of claim 11, further comprising:
generating ACK/NACK transmission region allocation information which comprises information for identifying a packet corresponding to the ACK/NACK transmission time,
wherein the information for identifying the packet is at least one of a frame offset between a frame carrying the ACK/NACK transmission region allocation information and a frame carrying the packet, an absolute frame number of the frame carrying the packet, a Connection IDentifier (CID), an Arq Channel ID (ACID), and a Sub Packet ID (SPID).

15. The method of claim 11, wherein the DL data processing delay time and the ACK/NACK processing delay time is the same for at least one of the RS and any other RS between the RS and the MS.

16. An operating method of a Relay Station (RS) in a multihop relay wireless communication system based on a centralized scheduling, the method comprising:
receiving information on a time interval that originated at a Base Station (BS), wherein the time interval specifies when the RS transmits an ACKnowledge (ACK)/Non ACK (NACK); and
transmitting the ACK/NACK in relation to a packet corresponding to the information on the time interval in a frame indicated by the information on the time interval,
wherein the information on the time interval comprises one of:
a frame offset between a first frame at which the RS receives the packet and a second frame at which the RS transmits the ACK/NACK,
a frame offset between a third frame at which the RS receives the ACK/NACK scheduling information and the second frame at which the RS transmits the ACK/NACK, and
an absolute frame number of the second frame at which the RS transmits the ACK/NACK, and
wherein the time interval is expressed in units of frames and is calculated using:
a DownLink (DL) data processing delay time within the RS and a DL data processing delay time within each of any other RS between the RS and a Mobile Station (MS),
an ACK/NACK transmission delay time within the MS, and
an ACK/NACK processing delay time within the RS and an ACK/NACK processing delay time within each of any other RS between the RS and the MS.

17. The method of claim 16, further comprising:
transmitting the DL data processing delay time of the RS in one of a network entry procedure and a capability negotiation procedure.

18. The method of claim 16, wherein the information on the time interval is received through map message which comprises resource allocation information of the packet.

19. The method of claim 16, further comprising:
confirming information for identifying the packet in ACK/NACK transmission region allocation information,
wherein the information for identifying the packet is at least one of a frame offset between a frame carrying the ACK/NACK transmission region allocation information and a frame carrying the packet, an absolute frame number of the frame carrying the packet, a Connection IDentifier (CID), an Arq Channel ID (ACID), and a Sub Packet ID (SPID).

20. The method of claim 16, wherein the DL data processing delay time and the ACK/NACK processing delay time is the same for at least one of the RS and any other RS between the RS and the MS.

21. An operating method of a Relay Station (RS) in a multihop relay wireless communication system based on a centralized scheduling, the method comprising:
receiving retransmission parameter values from a Base Station (BS), wherein the retransmission parameter values comprise:
a DownLink (DL) data processing delay time within each of any other RS between the RS and the MS,
an ACK/NACK transmission delay time within the MS, and
an ACK/NACK processing delay time within each of any other RS between the RS and the MS;
calculating a time interval using the retransmission parameter values, wherein the time interval specifies when the RS transmits an ACKnowledge (ACK)/Non ACK (NACK) and is expressed in units of frames; and
transmitting the ACK/NACK according to the time interval,
wherein the time interval comprises one of:
a frame offset between a first frame at which the RS receives the packet and a second frame at which the RS transmits the ACK/NACK,
a frame offset between a third frame at which the RS receives the ACK/NACK scheduling information and the second frame at which the RS transmits the ACK/NACK, and
an absolute frame number of the second frame at which the RS transmits the ACK/NACK.

22. The method of claim 21, wherein the DL data processing delay time and the ACK/NACK processing delay time is the same for at least one of the RS and any other RS between the RS and the MS.

* * * * *